United States Patent
Hasegawa et al.

(10) Patent No.: US 12,449,589 B2
(45) Date of Patent: Oct. 21, 2025

(54) MULTICORE OPTICAL FIBER

(71) Applicant: SUMITOMO ELECTRIC INDUSTRIES, LTD., Osaka (JP)

(72) Inventors: Takemi Hasegawa, Osaka (JP);
Takahiro Suganuma, Osaka (JP);
Hirotaka Sakuma, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 224 days.

(21) Appl. No.: 18/026,615

(22) PCT Filed: Oct. 13, 2021

(86) PCT No.: PCT/JP2021/037886
§ 371 (c)(1),
(2) Date: Mar. 16, 2023

(87) PCT Pub. No.: WO2022/085534
PCT Pub. Date: Apr. 28, 2022

(65) Prior Publication Data
US 2023/0333311 A1    Oct. 19, 2023

(30) Foreign Application Priority Data
Oct. 23, 2020    (JP) ................. 2020-177977

(51) Int. Cl.
*G02B 6/02* (2006.01)
(52) U.S. Cl.
CPC ..... *G02B 6/02042* (2013.01); *G02B 6/02333* (2013.01); *G02B 6/02395* (2013.01)

(58) Field of Classification Search
CPC ............ G02B 6/02042; G02B 6/02333; G02B 6/02395
See application file for complete search history.

(56) References Cited

U.S. PATENT DOCUMENTS

| 9,618,692 B2 | 4/2017 | Berkey et al. |
| 2011/0222828 A1 | 9/2011 | Sasaoka et al. |

(Continued)

FOREIGN PATENT DOCUMENTS

| CN | 104678484 A | * 6/2015 | ....... C03B 37/01222 |
| CN | 110268295 A |   9/2019 | |

(Continued)

OTHER PUBLICATIONS

Fevrier, Herve et al., "Facebook Perspective on Submarine Wet Plant Evolution," Proceedings of OFC 2019, 2019, pM2E.4.

(Continued)

*Primary Examiner* — Thomas A Hollweg
*Assistant Examiner* — Marc E Manheim
(74) *Attorney, Agent, or Firm* — Faegre Drinker Biddle & Reath LLP

(57) ABSTRACT

A multicore optical fiber of an embodiment has a structure for simultaneously realizing low transmission loss, low fusion splicing loss, and low inter-core crosstalk. The multicore optical fiber includes a plurality of cores comprised of silica glass, a common cladding comprised of silica glass and surrounding the plurality of cores, and a resin coating surrounding the common cladding. The common cladding has a refractive index lower than a refractive index of the plurality of cores. Each of the plurality of cores contains chlorine at 10000 ppm or more in at least part thereof.

1 Claim, 3 Drawing Sheets

(56) References Cited

U.S. PATENT DOCUMENTS

| | | | |
|---|---|---|---|
| 2013/0044988 A1* | 2/2013 | Tanigawa | G02B 6/02042 |
| | | | 385/126 |
| 2017/0003445 A1 | 1/2017 | Bookbinder et al. | |
| 2018/0224607 A1* | 8/2018 | Bookbinder | G02B 6/2552 |
| 2019/0113678 A1 | 4/2019 | Nagasu et al. | |
| 2021/0063208 A1 | 3/2021 | Li | |

FOREIGN PATENT DOCUMENTS

| | | | | |
|---|---|---|---|---|
| JP | 2003-131060 A | | 5/2003 | |
| JP | 2007-052458 A | | 3/2007 | |
| JP | 2011209702 A | * 10/2011 | | G02B 6/02042 |
| JP | 2018165237 A | * 10/2018 | | C03B 37/01222 |
| JP | 2019101363 A | * 6/2019 | | |
| WO | WO-2017/170652 A1 | | 10/2017 | |
| WO | 2018/148187 A1 | | 8/2018 | |
| WO | WO-2019/079690 A1 | | 4/2019 | |

OTHER PUBLICATIONS

Palacios, Florence et al., "Ultra-Large Effective Area Fibre Performances in High Fibre Count Cables and Joints, A New Technical Challenge," Proceedings of SubOptic 2016, 2016, pTU1A-2.

Tamura, Yoshiaki et al., "Low-Loss Uncoupled Two-Core Fiber for Power Efficient Practical Submarine Transmission," Proceedings of OFC 2019, 2019, pM1E.5.

\* cited by examiner

MULTICORE OPTICAL FIBER

TECHNICAL FIELD

The present disclosure relates to a multicore optical fiber (hereinafter, will be described as "MCF").

This application claims the benefit of Japanese Patent Application No. 2020-177977, filed Oct. 23, 2020, the content of which is relied upon and incorporated herein by reference in its entirety.

BACKGROUND ART

Space-division multiplexed optical fibers including a plurality of spatial channels provided therein have attracted attention as means for increasing a transmission capacity of a transmission path having a spatial constraint. Among such optical fibers, in a MCF having a structure in which a cladding with a predetermined refractive index contains a plurality of cores with a refractive index higher than that of the cladding, each core can be designed to maintain compatibility with the conventional optical fiber. The MCF there has an advantage in that introduction cost is low.

While a MCF has a spatial constraint, the MCF is a transmission medium efficient especially in a transmission path being in a high demand for transmission capacity. One of representative examples of such transmission paths is a submarine optical cable. If an outer diameter of the submarine optical cable becomes thicker, manufacturing cost and laying cost of the cable itself increase. Thus, Non-Patent Document 1 discloses that a cable outer diameter is constrained, and the typical number of storable optical fibers is about 32. On the other hand, transmission capacity demand of the submarine optical cable has exponentially increased together with an increase in data exploitation, and Non-Patent Document 2 has pointed out the necessity of a cable that can store optical fibers by the number exceeding 32 described above.

As a MCF suitable for a submarine optical cable, there is a two-core optical fiber disclosed in Non-Patent Document 3, for example. The two-core optical fiber includes two cores in a cladding with an outer diameter of 125 μm. The two cores each include a center core slightly doped with fluorine, a ring core comprised of pure silica, and an inner cladding doped with fluorine. In addition, the two cores are arranged in such a manner that a center-to-center pitch thereof becomes 50 μm, in a state of being surrounded by a common cladding, and the common cladding is also doped with fluorine. Non-Patent Document 3 described above describes that inter-core crosstalk caused when a signal is counter-propagated to two cores can be set to −40 dB/100 km or less. This is inter-core crosstalk caused when same direction propagation is performed in a case where a relay span length is assumed to be 50 kin, and corresponds to −17 dB/100 km or less. The two-core optical fiber operates in a single mode in a wavelength of 1530 nm or more, by the two cores having a cable cutoff wavelength of 1530 nm or less, and its transmission loss is controlled to be a low value being 0.162 dB/km, in a wavelength of 1550 nm.

CITATION LIST

Patent Literature

Patent Document 1: U.S. Pat. No. 9,618,692

Non-Patent Literature

Non-Patent Document 1: Florence Palacios, et al., "Ultra-Large Effective Area Fibre Performances in High Fibre Count Cables and Joints, A New Technical Challenge," Proceedings of SubOptic 2016, TU1A-2 (2016).

Non-Patent Document 2: Herve Fevrier, et al., "Facebook Perspective on Submarine Wet Plant Evolution," Proceedings of OFC 2019, M2E.4 (2019).

Non-Patent Document 3: Yoshiaki Tamura, et al., "Low-Loss Uncoupled Two-Core Fiber for Power Efficient Practical Submarine Transmission," Proceedings of OFC 2019, M1E.5 (2019).

SUMMARY OF INVENTION

A MCF (multicore optical fiber) of the present disclosure includes a plurality of cores, a common cladding, and a resin coating. Each of the plurality of cores is comprised of silica glass. The common cladding is comprised of silica glass, and surrounds the plurality of cores. In addition, the common cladding has a refractive index lower than a refractive index of each of the plurality of cores. The resin coating surrounds the common cladding. In particular, each of the plurality of cores contains chlorine with 10000 ppm or more in at least part thereof.

DESCRIPTION OF EMBODIMENTS

Figure 1:
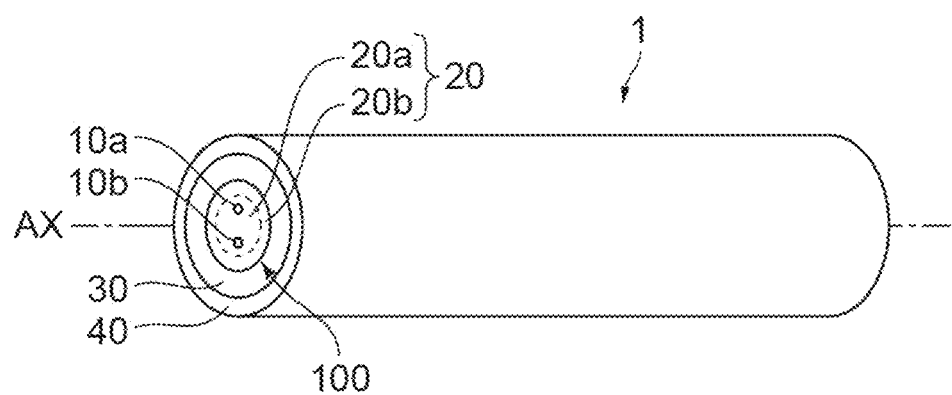
FIG. 1 is a conceptual diagram of a MCF according to an embodiment of the present disclosure.

Problem to be Solved by Present Disclosure

The inventors have considered the aforementioned prior art, and consequently discovered the following problem. More specifically, Non-Patent Document 2 described above discloses, as one of means, reducing an outer diameter of a coating resin of an optical fiber to 200 μm from conventional 250 μm, but improvement in spatial density that is caused by the reduction remains at only 1.4 times, and moreover, a reduction in coating thickness decreases mechanical reliability. Thus, according to the means disclosed in Non-Patent Document 2, additional cost for ensuring sufficient reliability might be incurred.

In addition, in the two-core optical fiber in Non-Patent Document 3 described above, a problem has lied in that connection loss in fusion splicing is likely to become higher. This is attributed to the fact that a center-to-center pitch of two cores is 50 μm, which is larger as compared with an outer diameter of the cladding being 125 μm. In fusion splicing, the viscosity at a terminal of a cut optical fiber declines due to heating, and at this time, a terminal of an outer peripheral portion of the cladding is deformed by surface tension in such a manner that an edge is rounded. In the outer peripheral portion of the cladding, an internal waveguide structure accordingly becomes more likely to deform as well. In addition, when an optical fiber is cut by cleavage, in the outer peripheral portion of the cladding, stress lacks stability (state in which stress added along a cladding outer peripheral does not become constant), and a crack might appear non-vertically with respect to a central axis (fiber axis) of the optical fiber. Such non-flatness of an end face also causes fusion splicing loss. Furthermore, in the case of fusion-splicing two optical fibers, by rotating the two optical fibers to be connected, about a fiber axis, rotational angles are made uniform in such a manner that the core arrangements of the two optical fibers become the same direction. At this time, there has been such a problem that a core position gap attributed to a rotational angle error becomes larger as a center-to-center pitch of the two cores becomes larger.

On the other hand, if a center-to-center pitch of the two cores is reduced to decrease fusion splicing loss, as disclosed in Non-Patent Document 3 described above, inter-core crosstalk increases. It is also possible to reduce inter-core crosstalk by increasing a refractive index difference between a core and a cladding. In the prior art, to realize low transmission loss, it is necessary to use pure silica glass or silica glass doped with fluorine at a low concentration of 3000 ppm or less, but in this case, a refractive index of the core becomes lower. To increase a refractive index difference between a core and a cladding, a refractive index of the cladding needs to be reduced, but if a fluorine concentration of the cladding is made higher, an increase in transmission loss and an increase in manufacturing cost are accordingly caused, which has been problematic.

The present disclosure has been devised to solve the aforementioned problems, and aims to provide a MCF having a structure for simultaneously realizing low transmission loss, low fusion splicing loss, and low inter-core crosstalk.

Effects of Present Disclosure

According to a multicore optical fiber of the present disclosure, low transmission loss, low fusion splicing loss, and low inter-core crosstalk can be simultaneously realized.

DESCRIPTION OF EMBODIMENT OF PRESENT DISCLOSURE

First of all, aspects of an embodiment of the present disclosure will be described by individually listing the aspects.

(1) A MCF (multicore optical fiber) of the present disclosure includes a plurality of cores, a common cladding, and a resin coating, as an aspect. Each of the plurality of cores is comprised of silica glass. The common cladding is comprised of silica glass, and surrounds the plurality of cores. In addition, the common cladding has a refractive index lower than a refractive index of each of the plurality of cores. The resin coating surrounds the common cladding. In particular, each of the plurality of cores contains chlorine with 10000 ppm or more in at least part thereof. With this configuration, it becomes possible to achieve both of low transmission loss and low inter-core crosstalk.

(2) As an aspect of the present disclosure, it is preferable that a concentration of the chlorine is 2000 ppm or less at a core-cladding boundary between each of the plurality of cores and the common cladding. In addition, it is preferable that, in a transition region of each of the plurality of cores that includes the core-cladding boundary, a concentration of the chlorine continuously decreases toward a direction of getting away from a refractive index centroid of each of the plurality of cores. In this case, blister formation is suppressed, and it becomes possible to improve productivity of a preform and a fiber.

(3) As an aspect of the present disclosure, it is preferable that the common cladding contains fluorine. In addition, it is preferable that, in a connection region of the common cladding, a concentration of the fluorine is 7500 ppm or less. In addition, it is preferable that a concentration of the fluorine continuously decreases toward a direction of getting close to a refractive index centroid of each of the plurality of cores. In this case, it becomes possible to realize low inter-core crosstalk.

(4) As an aspect of the present disclosure, it is preferable that, at the core-cladding boundary, a concentration of the fluorine is 11000 ppm or less. In this case, blister formation is suppressed, and it becomes possible to improve productivity of a preform and a fiber.

(5) As an aspect of the present disclosure, the common cladding may include a first common cladding directly surrounding each of the plurality of cores, and a second common cladding surrounding the first common cladding. In addition, it is preferable that an average concentration of the fluorine in the first common cladding is larger than an average concentration of the fluorine in the second common cladding by 900 ppm or more. In this case, tension tensile force can be prevented from remaining in each core, and low transmission loss and high relative refractive index difference can be achieved.

(6) As an aspect of the present disclosure, the MCF may include two cores as a plurality of cores. In addition, it is preferable that an inter-core pitch of these two cores is 30 μm or more and 45 μm or less, an outer diameter of the first common cladding is 60 μm or more and 85 μm or less, and an outer diameter of the second common cladding is 124 μm or more and 126 μm or less. In this case, tension tensile force can be prevented from remaining in each core, and low transmission loss, high relative refractive index difference, and furthermore, low fusion splicing loss can be achieved.

(7) As an aspect of the present disclosure, it is preferable that inter-core crosstalk in the two cores is −30 dB/100 km or more and −18 dB/100 km or less in a wavelength of 1550 nm. In this case, long-haul and large-capacity transmission can be realized.

The aspects listed above in the section of [Description of Embodiment of Present Disclosure] can be applied to each of all the remaining aspects, or a combination of all of these remaining aspects.

DETAILS OF EMBODIMENT OF PRESENT DISCLOSURE

Hereinafter, a specific structure in a specific example of a MCF (multicore optical fiber) according to an embodiment of the present disclosure will be described in detail with reference the attached drawings. Note that the present invention is not limited by these exemplifications, and intended to include the meanings indicated by the appended claims and equivalent to the appended claims, and all changes within the scope. In addition, in the description of the drawings, the same components are assigned the same reference numerals, and the redundant description will be omitted.

Definition of Terms (a) In this specification, unless otherwise specified, when a refractive index of a certain medium is denoted by n and a refractive index of pure silica glass is denoted by n0, a relative refractive index difference $\Delta$ of the medium is defined by the following formula (1):

$$\Delta = (n/n0) - 1 \tag{1}$$

(b) When a radius coordinate of an optical fiber is denoted by r, and a relative refractive index difference Δ in a region with an inner radius r0 and an outer radius r1 is approximated using the following formula (2):

$$\Delta = \Delta 0 + (\Delta 1 - \Delta 0) \times ((r - r0)/(r1 - r0))^{\alpha 01} \quad (2),$$

α01 will be referred to as an index number α (hereinafter, described as "α value") of the region. At this time, Δ0 and Δ1 correspond to radius r=r0 and r1, that is to say, a relative refractive index difference at both ends of the region, and α01 is determined based on the least-square method.

(c) A "concentration" of material doped in silica glass is represented by mass concentration unless otherwise stated. More specifically, a concentration of material doped in silica glass is represented by a ratio of a weight of the material doped into a specific region, with respect to a weight of silica glass in the specific region.

(d) In a MCF, "inter-core crosstalk caused when same direction propagation is performed" indicates a ratio, with respect to power of light that enters one core positioned at one end of the MCF, and exits from another end of the same core, of power of light emitted from one of other cores positioned at another end of the MCF.

(e) In a MCF, "inter-core crosstalk caused when counter-propagation is performed" indicates a ratio, with respect to power of light that enters one core positioned at one end of the MCF, and exits from another end of the same core, of power of light emitted from one of other cores positioned at the same end. Note that, in this specification, in a case where inter-core crosstalk is simply described as "inter-core crosstalk", the inter-core crosstalk means inter-core crosstalk caused when same direction propagation is performed.

(f) A pitch between two cores (hereinafter, described as "inter-core pitch") is defined as a distance between refractive index centroids of the respective cores. Note that a refractive index centroid (X,Y) of a certain region S means a centroid position weighted using a refractive index n (x,y) in the region:

$$\left( X = \frac{\int_S x n(x, y) dxdy}{\int_S n(x, y) dxdy} , Y = \frac{\int_S y n(x, y) dxdy}{\int_S n(x, y) dxdy} \right).$$

(g) A "noncircular state" of a cross-section (defined on a surface orthogonal to a fiber axis equivalent to a central axis of an optical fiber) of a cladding or the like is defined by the following formula (3):

$$2 \times (\text{long diameter} - \text{short diameter})/(\text{long diameter} + \text{short diameter}) \quad (3).$$

(h) A "transition region" is a region defined on a cross-section of an optical fiber, and is a region in each of a plurality of cores that has a width of 1 μm or more and 5 μm or less, and includes a core-cladding boundary between each core and a cladding.

(i) A "connection region" is a region defined on a cross-section of an optical fiber, and is a region that has a width of 0.5 μm or more and 2.5 μm or less, constitutes a part of a cladding surrounding each core, and directly contacts each core in the cladding.

EMBODIMENT

FIG. 1 illustrates a MCF 1 according to an embodiment of the present disclosure. The MCF 1 includes a glass fiber 100 extending along a central axis (fiber axis) AX, a first coating 30 surrounding an outer periphery of the glass fiber 100, and a second coating 40 surrounding an outer periphery of the first coating 30. The glass fiber 100 includes two cores 10a and 10b extending along the central axis AX, and a common cladding 20 surrounding the two cores 10a and 10b. In addition, the common cladding 20 includes a first common cladding 20a (inner cladding) directly surrounding the two cores 10a and 10b, and a second common cladding 20b (outer cladding) surrounding the first common cladding 20a.

The two cores 10a and 10b and the common cladding 20 all are comprised of silica glass, and can contain halogen such as chlorine (Cl), fluorine (F), or bromine (Br). Each of the two cores 10a and 10b contains Cl at a concentration of 10000 ppm or more, and accordingly has a relative refractive index difference of 0.10% or more with respect to pure silica glass. More preferably, each of the cores 10a and 10b contains Cl at 15000 ppm or more, and has a relative refractive index difference of 0.15% or more. Further preferably, each of the cores 10a and 10b contains Cl at 20000 ppm or more, and has a relative refractive index difference of 0.20% or more. On the other hand, a Cl concentration in each of the cores 10a and 10b is 30000 ppm or less, and blister formation during a manufacturing process of an optical fiber is thereby suppressed (consequently, optical fiber manufacturing with high productivity can be performed). In addition, aside from Cl, each of the cores 10a and 10b may contain one or more elements of F and Br, and it is preferable to accordingly reduce the respective viscosities of the cores 10a and 10b from the viewpoint of manufacturability. The common cladding 20 has a refractive index lower than both refractive indices of the cores 10a and 10b, and a region that has a width of 10 μm, and has an inner periphery corresponding to a core-cladding boundary (a boundary between each of the cores 10a and 10b and the common cladding 20) has a relative refractive index difference of −0.50% or more and −0.20% or less with respect to a refractive index of each of the cores 10a and 10b.

The common cladding 20 is comprised of pure silica glass or silica glass containing F. An F concentration is 0 ppm or more and 11000 ppm or less, and the common cladding 20 accordingly has a relative refractive index difference of −0.36% or more and 0% or less with respect to a refractive index of pure silica glass. More preferably, an F concentration is 0 ppm or more and 7500 ppm or less, and the common cladding 20 accordingly has a relative refractive index difference of −0.25% or more and 0% or less. With the aforementioned configuration, as compared with the two-core fiber in Non-Patent Document 3 described above, an F concentration in a cladding can be significantly decreased, and it becomes possible to reduce transmission loss and manufacturing cost of an optical fiber.

In addition, each of the cores 10a and 10b has a diameter of 6 μm or more and 16 μm or less, and accordingly has a cable cutoff wavelength of a wavelength of 1530 nm or less. More preferably, each of the cores 10a and 10b has a cable cutoff wavelength of a wavelength of 1480 nm or less.

It is preferable that an outer diameter of the common cladding 20 is a standard outer diameter of 124 μm or more and 126 μm or less. A noncircular state of a cross-section of the common cladding 20 is only required to be 0.1% or more and 2.0% or less, and by the cross-section of the common cladding 20 being in a noncircular state other than 0%, it is possible to enhance measurement accuracy of a rotational angle when rotation alignment is performed for fusion splicing. More preferably, a noncircular state of the cross-section of the common cladding 20 is 0.2% or more and 1.0% or less.

The first coating 30 and the second coating 40 include urethane series ultraviolet curable resin. It is preferable that the first coating has a thickness of 15 μm or more and 40 μm, and has an elastic modulus of 0.05 MPa or more and 0.5 MPa or less. It is preferable that the second coating 40 has a thickness of 15 μm or more and 40 μm, and has an elastic modulus of 500 MPa or more and 2000 MPa or less. With this configuration, external force added from the lateral side of an optical fiber is efficiently blocked, and micro-bending loss attributed to glass deformation in the cores 10a and 10b, and the common cladding 20 can be suppressed.

Figure 2:
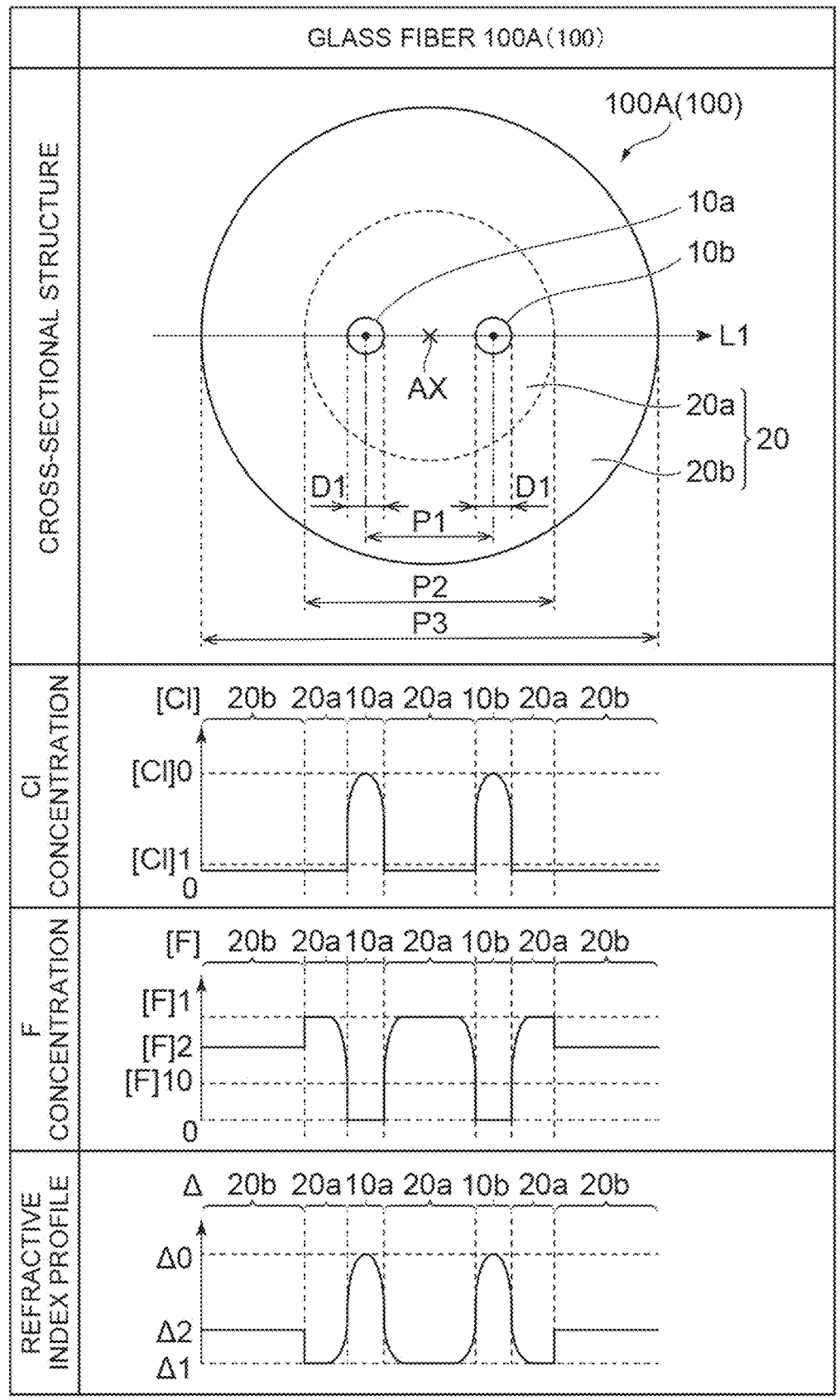
FIG. 2 is a conceptual diagram of a cross-sectional structure, a Cl concentration, an F concentration, and a refractive index profile of a glass fiber included in a MCF according to a first embodiment of the present disclosure.

FIG. 2 illustrates a cross-sectional structure, a Cl concentration, an F concentration, and a refractive index profile of a glass fiber 100A (equivalent to the glass fiber 100 in FIG. 1) included in a MCF according to a first embodiment of the present disclosure. Note that, in FIG. 2, a Cl concentration is displayed as [Cl], and [Cl]0 indicates a maximum Cl concentration of the cores 10a and 10b, and [Cl]1 indicates a Cl concentration at a core-cladding boundary. An F concentration is displayed as [F], and [F] 1 indicates a maximum F concentration in the first common cladding 20a of the common cladding 20, [F]2 indicates an average F concentration in the second common cladding 20b of the common cladding 20, and [F]10 indicates an F concentration at a core-cladding boundary. In addition, a refractive index profile is defined by a relative refractive index difference of each portion on a line L1 passing through the central axis AX in the cross-section of the glass fiber 100A, and $\Delta 0$ indicates a maximum relative refractive index difference of the cores 10a and 10b, $\Delta 1$ indicates a minimum relative refractive index difference of the first common cladding 20a, and $\Delta 2$ indicates an average relative refractive index difference of the second common cladding 20b.

The transmission loss may be reduced by maximizing a distance to a cladding outer edge by arranging two cores on a symmetrical axis. Alternatively, the accuracy of rotational angle at the time of alignment may be enhanced by arranging two cores with being shifted from the symmetrical axis. Note that a cross-sectional structure of the glass fiber 100A illustrated in FIG. 2 is substantially identical to the cross-sectional structure of the glass fiber 100 illustrated in FIG. 1, and P1 indicates an inter-core pitch, P2 indicates an outer diameter of the first common cladding 20a, and P3 indicates an outer diameter of the second common cladding 20b.

In the glass fiber 100A, each of the cores 10a and 10b is doped with Cl, and the Cl concentration [Cl] forms an approximately-flat concentration distribution at the respective center portions of the cores 10a and 10b at the concentration [Cl]0, and continuously decreases up to the concentration [Cl]1 at the core-cladding boundary. Consequently, the respective relative refractive index differences of the cores 10a and 10b with respect to pure silica become $\Delta 0$ at the center portion and $\Delta 1$ at the core-cladding boundary. An upper limit of the concentration [Cl]0 is 10000 ppm, and $\Delta 0$ is 0.10%. Preferably, an upper limit of the concentration [Cl]0 is 15000 ppm, and $\Delta 0$ is 0.15%. Further preferably, an upper limit of the concentration [Cl]0 is 20000 ppm, and $\Delta 0$ is 0.20%. An upper limit of the concentration [Cl]1 is 2000 ppm, and $\Delta 1$ is 0.02%. Preferably, an upper limit of the concentration [Cl]1 is 1000 ppm, and $\Delta 1$ is 0.01%. More preferably, an upper limit of the concentration [Cl]1 is 0 ppm, and $\Delta 1$ is 0%.

A core having the aforementioned Cl concentration distribution can be realized by increasing a specific surface area of a soot body when a glass soot body manufactured using a Vapor-phase Axial Deposition (VAD) method or an Outside Vapor Deposition (OVD) method is sintered using chlorine gas atmosphere such as Cl2 or SiCl4, or increasing a partial pressure of chlorine gas at the time of sintering, to a pressure equivalent to an atmospheric pressure or to a severalfold pressure thereof. In particular, by increasing a chlorine gas concentration of a hollow portion in a hollow soot body manufactured using the OVD method, from an outer peripheral portion, it is preferable to form a Cl concentration distribution decreasing toward an outer periphery. Specifically, an α value obtained when a distribution of relative refractive index differences that is attributed to Cl doping is approximated using the above-described formula (2) for the entire core is preferably 50 or less, and is more preferably 20 or less. Consequently, blister attributed to gasification of a Cl compound is suppressed in the vicinity of the core-cladding boundary, and it becomes possible to prevent a yield ratio decrease in a preform process and a drawing process. On the other hand, if a change in Cl concentration distribution in the vicinity of the core-cladding boundary is made gradual, when an optical fiber is observed from the lateral side at the time of fusion splicing, the core-cladding boundary becomes unclear, and the accuracy of positioning and angle adjustment might decline. Thus, an α value obtained when a refractive index distribution is approximated using the above-described formula (2) for the entire core is preferably 3 or more, and is more preferably 5 or more.

An inter-core pitch is 45 μm, is preferably 40 μm, is more preferably 35 μm, and is further preferably 30 μm. By narrowing an inter-core pitch, cores can be gathered to the cross-section center of an optical fiber. With this configuration, when optical fibers are fusion-spliced by cutting the optical fibers, even in a case where an outer peripheral edge of a cladding on an end face is rounded (deformation caused by surface tension when glass is softened by heating), core deformation can be suppressed. In addition, although the flatness of an end face decreases in many cases when fibers are cut because stress lacks stability in the vicinity of the cladding outer periphery, according to the present embodiment, a decrease in core flatness can be effectively suppressed. Furthermore, a core position gap attributed to a rotational angle adjustment error is also reduced. Consequently, fusion splicing loss is suppressed to 0.10 dB or less, preferably to 0.08 dB or less, more preferably to 0.06 dB or less, and further preferably to 0.04 dB or less.

The first common cladding 20a is comprised of pure silica glass or doped with F having a concentration [F]1, and a relative refractive index difference with respect to pure silica accordingly becomes $\Delta 1$. The second common cladding 20b is doped with F having a concentration [F]2, and a relative refractive index difference with respect to pure silica becomes $\Delta 2$. In a region (connection region of the common cladding 20) that directly contacts each core and has a width of 0.5 μm or more and 2.5 μm or less, the F concentration [F] in the first common cladding 20a continuously decreases up to a concentration [F]10 along a direction of getting closer to the core, and a relative refractive index difference with respect to pure silica decreases up to $\Delta 10$ (relative refractive index difference at the core-cladding boundary, which is not illustrated in the drawing). An upper limit of the concentration [F]1 is 11000 ppm, and $\Delta 1$ consequently becomes −0.36%. Preferably, an upper limit of the concentration [F]1 is 7500 ppm, and $\Delta 1$ is 0.25%. More preferably, an upper limit of the concentration [F]1 is 0, and $\Delta 1$ is 0 as well. In addition, an upper limit of the concentration [F]10 is 7500 ppm, and an upper limit of the concentration [F]10 is preferably, 5000 ppm. In addition, a lower limit of [F]1-[F]10 is 1500 ppm, and $\Delta1$-$\Delta10$ consequently becomes −0.05%. Preferably, a lower limit of [F]1-[F]10 is 3000 ppm, and $\Delta1$-$\Delta10$ consequently becomes −0.10%. By increasing $\Delta1$-$\Delta10$, it is possible to achieve the suppression of interfacial blister attributed to fluorine addition and a loss increase caused by Rayleigh scattering, and the suppression of bending loss by confining light strongly. More preferably, an upper limit of the concentration [F]10 is 0 ppm.

In addition, the connection region (region contacting each core and having a width of 0.5 μm or more and 2.5 μm or less) of the first common cladding 20$a$ is important because of having major impact on optical characteristics, but when an average relative refractive index difference in the connection region is denoted by $\Delta1$avg, a lower limit of $\Delta0$-$\Delta1$avg is preferably 0.36%. More preferably, a lower limit of $\Delta0$-$\Delta1$avg is 0.32%. Further preferably, a lower limit of $\Delta0$-$\Delta1$avg is 0.28%. An outer diameter of each of the cores 10$a$ and 10$b$ is preferably 6 μm or more and 16 μm or less. With this configuration, each of the cores 10$a$ and 10$b$ has a cable cutoff wavelength of 1530 nm or less, and it becomes possible to keep compatibility with an existing submarine cable system. More preferably, an outer diameter of each of the cores 10$a$ and 10$b$ is 6 μm or more and 14 μm or less. With this configuration, each of the cores 10$a$ and 10$b$ has a cable cutoff wavelength of 1480 nm or less, and it becomes possible to support a wavelength multiplex transmission in a wider wavelength band. A cable cutoff wavelength is preferably 1260 nm or more, and inter-core crosstalk caused when same direction propagation is performed can be accordingly set to −18 dB/100 km or less (equivalent to inter-core crosstalk caused when counter-propagation is performed: −42 dB/100 km or less), and the optical fiber can be preferably used for long-haul transmission. More preferably, a cable cutoff wavelength is 1310 nm or more, and inter-core crosstalk caused when same direction propagation is performed can be accordingly set to −20 dB/100 km or less (equivalent to inter-core crosstalk caused when counter-propagation is performed: −44 dB/100 km or less), and the optical fiber can be preferably used for long-haul transmission.

The concentration [F]2 is lower than the concentration [F]1 by 900 ppm or more, and $\Delta2$ is higher than $\Delta1$ by 0.03% or more. Preferably, the concentration [F]2 is lower than the concentration [F]1 by 1500 ppm or more, and $\Delta2$ is higher than $\Delta1$ by 0.05% or more. More preferably, the concentration [F]2 is lower than the concentration [F]1 by 3000 ppm or more, and $\Delta2$ is higher than $\Delta1$ by 0.10% or more. With this configuration, viscosities of the second common cladding 20$b$ increase, and it is possible to prevent an increase in transmission loss that is caused by tension stress attributed to tensile force applied in drawing, remaining in the cores 10$a$ and 10$b$, and a decrease in a relative refractive index difference between a core and a cladding. To suppress an increase in transmission loss, tension stress remaining all the cores is preferably 10 MPa or less, and is more preferably 0 MPa or less (i.e., compression stress). An outer diameter of the first common cladding 20$a$ is 85 μm or less, and is preferably 60 μm or less. With this configuration, an area of the second common cladding 20$b$ can be increased sufficiently, and it is possible to surely prevent stress attributed to drawing tensile force, from remaining in the cores 10$a$ and 10$b$. In this manner, Patent Document 1 described above also describes that, by doping high-concentration Cl to a core, the viscosity of the core is decreased, and by managing a doping amount of F to be doped to decrease a refractive index of a cladding, an increase in transmission loss that is caused by tension stress attributed to tensile force applied in drawing, remaining in the core can be suppressed. Unlike Patent Document 1 described above, in the present disclosure, by using a plurality of cores, and sharing drawing tensile force among the plurality of cores, it is possible to more effectively prevent tension stress from remaining. In addition, a Cl-doping amount for a core that is required to obtain the same transmission loss can be reduced, and it is accordingly possible to reduce the decrease of yield ratio caused by Cl forming blister in a preform.

The concentration [F]10 is preferably 70% or less with respect to the concentration [F]1. More preferably, the concentration [F]10 is 50% or less with respect to the concentration [F]1. Consequently, blister formation attributed to gasification of an F compound is suppressed in the vicinity of a core-cladding interface, and it becomes possible to manufacture a preform and a fiber at a high yield ratio.

Figure 3:
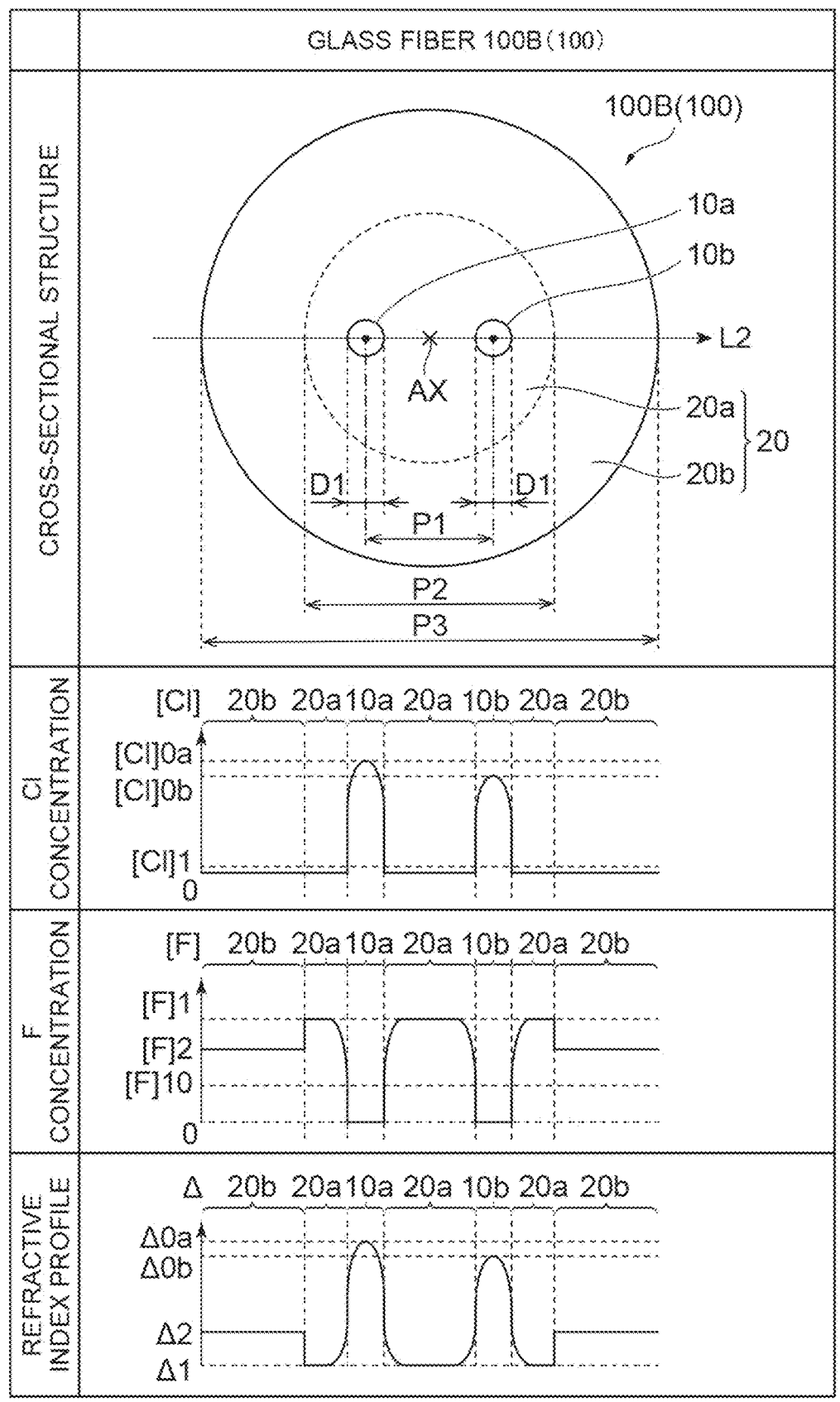
FIG. 3 is a conceptual diagram of a cross-sectional structure, a Cl concentration, an F concentration, and a refractive index profile of a glass fiber included in a MCF according to a second embodiment of the present disclosure.

FIG. 3 illustrates a cross-sectional structure, a Cl concentration, an F-concentration, and a refractive index profile of a glass fiber 100B (equivalent to the glass fiber 100 in FIG. 1) included in a MCF according to a second embodiment of the present disclosure. Note that, in FIG. 3, a Cl concentration is displayed as [Cl], and [Cl]0$a$ indicates a maximum Cl concentration of the core 10$a$, [Cl]0$b$ indicates a maximum Cl concentration of the core 10$b$, and [Cl]1 indicates a Cl concentration at a core-cladding boundary. An F concentration is displayed as [F], and [F]1 indicates a maximum F concentration in the first common cladding 20$a$ of the common cladding 20, [F]2 indicates an average F concentration in the second common cladding 20$b$ of the common cladding 20, and [F]10 indicates an F concentration at a core-cladding boundary. In addition, a refractive index profile is defined by a relative refractive index difference of each portion on a line L2 passing through the central axis AX in the cross-section of the glass fiber 100B, and $\Delta0a$ indicates a maximum relative refractive index difference of the core 10$a$, $\Delta0b$ indicates a maximum relative refractive index difference of the core 10$b$, $\Delta1$ indicates a minimum relative refractive index difference of the first common cladding 20$a$, and $\Delta2$ indicates an average relative refractive index difference of the second common cladding 20$b$.

In addition, a cross-sectional structure of the glass fiber 100B illustrated in FIG. 3 is substantially identical to the cross-sectional structure of the glass fiber 100A illustrated in FIG. 2, and P1 indicates an inter-core pitch, P2 indicates an outer diameter of the first common cladding 20$a$, and P3 indicates an outer diameter of the second common cladding 20$b$. Nevertheless, in the glass fiber 100B, a Cl concentration of the core 10$a$ and a Cl concentration of the core 10$b$ differ from each other, and a relative refractive index difference of the core 10$a$ and a relative refractive index difference of the core 10$b$ consequently differ from each other. In this point, the structure of the glass fiber 100B (FIG. 3) and the structure of the glass fiber 100A (FIG. 2) are different. Specifically, the Cl concentration of the core 10$a$ is [Cl]0$a$, and a relative refractive index difference thereof is $\Delta0a$. In addition, a Cl concentration of the core 10$b$ is [Cl]0$b$, and a relative refractive index difference thereof is $\Delta0b$. |[Cl]0$a$−[Cl]0$b$| (absolute value display) is 2000 ppm or more, and |$\Delta0a$−$\Delta0b$| is 0.02% or more. Preferably, |[Cl]0$a$−[Cl]0$b$| is 5000 ppm or more, and |$\Delta0a$−$\Delta0b$| is 0.05% or more. With this configuration, a propagation constant difference is formed between the two cores 10$a$ and 10$b$, and inter-core crosstalk caused when same direction propagation is performed becomes −21 dB/100 km or less (equivalent to inter-core crosstalk caused when counter-propagation is performed: −45 dB/100 km or less), and inter-core crosstalk caused when same direction propagation is performed more preferably becomes −24 dB/100 km or less (equivalent to inter-core crosstalk caused when counter-propagation is performed: −48 dB/100 km or less), and long-haul and high-signal-to-noise ratio transmission can be realized.

REFERENCE SIGNS LIST

1 MCF (multicore optical fiber)
10a, 10b Core
20 Common cladding
20a First common cladding (inner cladding)
20b Second common cladding (outer cladding)
30 First coating (resin coating)
40 Second coating (resin coating)
100, 100A, 100B Glass fiber

The invention claimed is:
1. A multicore optical fiber comprising:
a plurality of cores comprised of silica glass;
a common cladding comprised of silica glass and surrounding the plurality of cores, the common cladding having a refractive index lower than a refractive index of each of the plurality of cores; and
a resin coating surrounding the common cladding,
wherein each of the plurality of cores contains chlorine at 10000 ppm or more in at least part thereof,
wherein a concentration of the chlorine is 2000 ppm or less at a core-cladding boundary between each of the plurality of cores and the common cladding, and
wherein, in a transition region of each of the plurality of cores that includes the core-cladding boundary, and has a width of 1 μm or more and 5 μm or less, the concentration of the chlorine continuously decreases in a direction from a refractive index centroid of each of the plurality of cores toward the common cladding.

* * * * *